United States Patent [19]
Bastenhof

[11] Patent Number: 5,771,848
[45] Date of Patent: Jun. 30, 1998

[54] DEVICE FOR FEEDING LIQUID FUEL TO A DIESEL-TYPE I.C. ENGINE

[75] Inventor: Dirk Bastenhof, Eaubonne, France

[73] Assignee: S.E.M.T. Peilstick, Saint Denis, France

[21] Appl. No.: 770,812

[22] Filed: Dec. 20, 1996

[30] Foreign Application Priority Data

Dec. 21, 1995 [FR] France .................................. 95 15286
Jan. 10, 1996 [FR] France .................................. 96 00212

[51] Int. Cl.$^6$ .................................................. F02B 47/02
[52] U.S. Cl. .......................................................... 123/25 C
[58] Field of Search ............................... 123/25 C, 25 D, 123/1 A, 575

[56] References Cited

U.S. PATENT DOCUMENTS

| | | | |
|---|---|---|---|
| 4,388,893 | 6/1983 | Apfel .................................... | 123/25 C |
| 4,412,512 | 11/1983 | Cottell .................................. | 123/25 C |
| 4,416,225 | 11/1983 | Constantine et al. ................. | 123/25 C |
| 4,459,943 | 7/1984 | Goodman .............................. | 123/25 A |
| 5,125,367 | 6/1992 | Ulrich et al. .......................... | 123/25 R |
| 5,174,247 | 12/1992 | Tosa et al. ............................. | 123/25 C |
| 5,400,746 | 3/1995 | Susa et al. ............................. | 123/25 C |
| 5,529,024 | 6/1996 | Wirbeleit et al. ..................... | 123/25 C |
| 5,560,344 | 10/1996 | Chan .................................... | 123/25 C |

FOREIGN PATENT DOCUMENTS

| | | |
|---|---|---|
| 61-76747 | 4/1986 | Japan . |
| WO8001190 | 6/1980 | WIPO . |
| WO9506805 | 3/1995 | WIPO . |

OTHER PUBLICATIONS

Motorship, vol. 70, No. 829, 1 Aug. 1989, pp. 17/18 "The Use of Emulsified Fuels".

Patent Abstracts of Japan, vol. 010, No. 231 (M–506), 12 Aug. 1986 corresponding to JP–A–61 065066 (Toyota Motor Corp.) dated Apr. 13, 1986.

*Primary Examiner*—Erick R. Solis
*Attorney, Agent, or Firm*—Sughrue, Mion, Zinn, Macpeak & Seas, PLLC

[57] ABSTRACT

The present invention relates to a device for feeding liquid fuel to a diesel-type I.C. engine, said device comprising a pipe feeding fuel to the injection pumps of said engine, said feed pipe forming a feed loop and comprising a pipe for admission of said fuel, means for treating and circulating said fuel and a pipe for introducing additional liquid into said fuel, characterized in that the point of connection of said pipe for introducing additional liquid to said fuel feed pipe is located immediately upstream of that part of said feed pipe which supplies said injection pumps of said engine, and in that a closure valve, capable of closing said feed pipe, is located immediately downstream of said part of the feed pipe which supplies said injection pumps of said engine.

5 Claims, 2 Drawing Sheets

DEVICE FOR FEEDING LIQUID FUEL TO A DIESEL-TYPE I.C. ENGINE

FIELD OF THE INVENTION

The present invention generally relates to diesel-type I.C. engines, and more particularly to a device for feeding liquid fuel to a diesel-type I.C. engine, the liquid fuel being able to have another liquid added thereto, intended for example to modify the characteristics of combustion.

BACKGROUND OF THE INVENTION

Diesel I.C. engines of this type are generally fed via a closed loop conducting the fuel to the inlet of injection pumps.

Such a feed is, for example, shown in accompanying FIG. 1.

That part of the loop connected to the injection pumps is under a circulation pressure of the order of 5 to 6 bars.

This closed loop conducting the fuel to the inlet of the injection pumps comprises a point of introduction of the fuel, a device for introducing additional liquid and for homogenizing, a circulation pump, a reheating device, a filtration device and finally the injection pump assembly and the injection nozzles of the engine.

On high-power engines, the additional liquid/fuel mixture represents a considerable circulating volume, which presents several drawbacks.

A first drawback of the devices feeding liquid fuel to a diesel-type I.C. engine is the length of time necessary to pass from operation involving fuel alone, to operation involving a mixture of additional liquid/fuel, and vice versa.

Another drawback of the devices feeding liquid fuel to a diesel-type I.C. engine is the length of time necessary to adapt the proportion of the quantity of additional liquid in the fuel as a function of the variation of charge of the engine.

A further drawback of the devices feeding liquid fuel to a diesel-type I.C. engine is the high cost of the device for homogenizing the additional liquid/fuel mixture, as this homogenizing device must produce an emulsion which, to be stable and provide good combustion, requires that the droplets of additional liquid do not exceed 10 $\mu$m.

It is therefore an object of the present invention to provide a device feeding liquid fuel to a diesel type I.C. engine which does not present the drawbacks of the devices of the prior art.

SUMMARY OF THE INVENTION

To that end, in accordance with the invention, the device for feeding liquid fuel to a diesel-type I.C. engine, said device comprising a pipe feeding fuel to the injection pumps of said engine, said feed pipe forming a feed loop and comprising a pipe for admission of said fuel, means for treating and circulating said fuel and a pipe for introducing additional liquid into said fuel, is characterized in that the point of connection of said pipe for introducing additional liquid, to said fuel feed pipe is located immediately upstream of that part of said feed pipe which supplies said injection pumps of said engine, and in that a closure valve, capable of closing said feed pipe, is located immediately downstream of said part of the feed pipe which supplies said injection pumps of said engine.

The device feeding liquid fuel to a diesel-type I.C. engine of the invention also satisfies any one of the following characteristics:

The point of connection of said pipe introducing additional liquid to said fuel feed pipe is composed of a mixer for said additional liquid and said fuel.

Said mixer is such that the drops of additional liquid present a size less than or equal to 0.5 mm.

Said pipe feeding fuel to said injection pumps comprises a device for measuring the flowrate of fuel circulating in said feed pipe, said measuring device being associated with a device for regulating the flowrate of additional liquid injected into said feed pipe.

BRIEF DESCRIPTION OF THE DRAWINGS

The invention will be more readily understood on reading the following description with reference to the accompanying drawings in which.

DESCRIPTION OF PREFERRED EMBODIMENT

Figure 1:
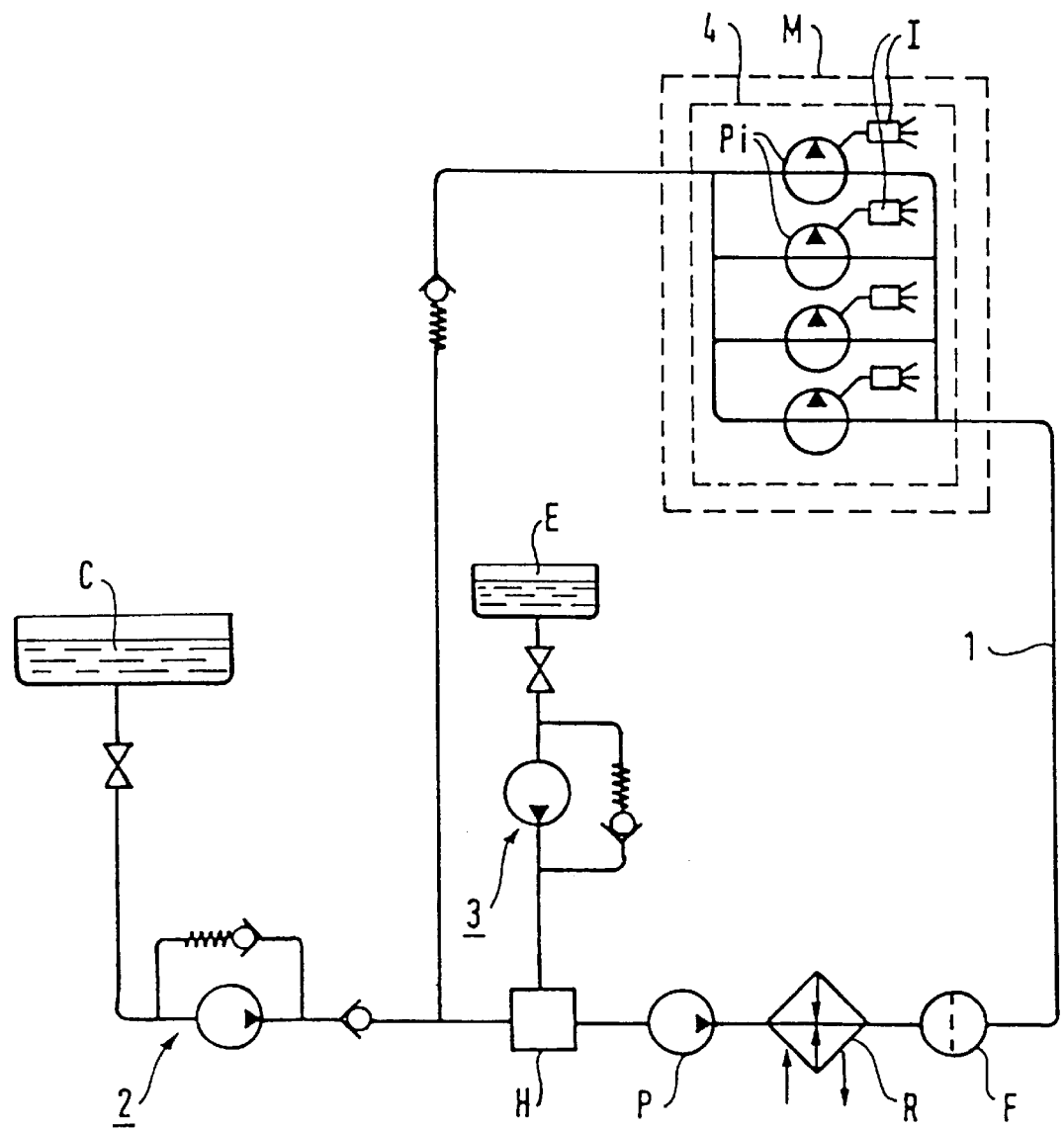
FIG. 1 is a diagram of a device for feeding liquid fuel to a diesel-type I.C. engine according to the prior art.

Referring now to the drawings, FIG. 1 shows a device for feeding liquid fuel to a diesel-type I.C. engine according to the prior art, in which the additional liquid is water.

As described hereinabove, a closed feed pipe 1 conducts a fuel C to the inlet of the injection pumps $P_i$ of an engine M.

This closed-loop feed pipe 1 receives an inlet pipe 2 of fuel C, an introduction pipe 3 of water E, a circulation pump P, a reheating device R, a filtering device F and, finally, an assembly 4 of injection pumps $P_i$ and of injection nozzles I of the engine M.

The end of the pipe 3 for introducing water E into the pipe feeding fuel C, is composed of a device H for homogenizing the water E and the fuel C.

Such a device for feeding liquid fuel C to a diesel-type I.C. engine M therefore principally comprises a pipe feeding fuel to the injection pumps $P_i$ of the engine M.

The feed pipe forms a supply loop and comprises an inlet pipe 2 for the fuel C, means for treating and circulating the fuel C and a pipe 3 for introducing water E into the fuel C.

Figure 2:
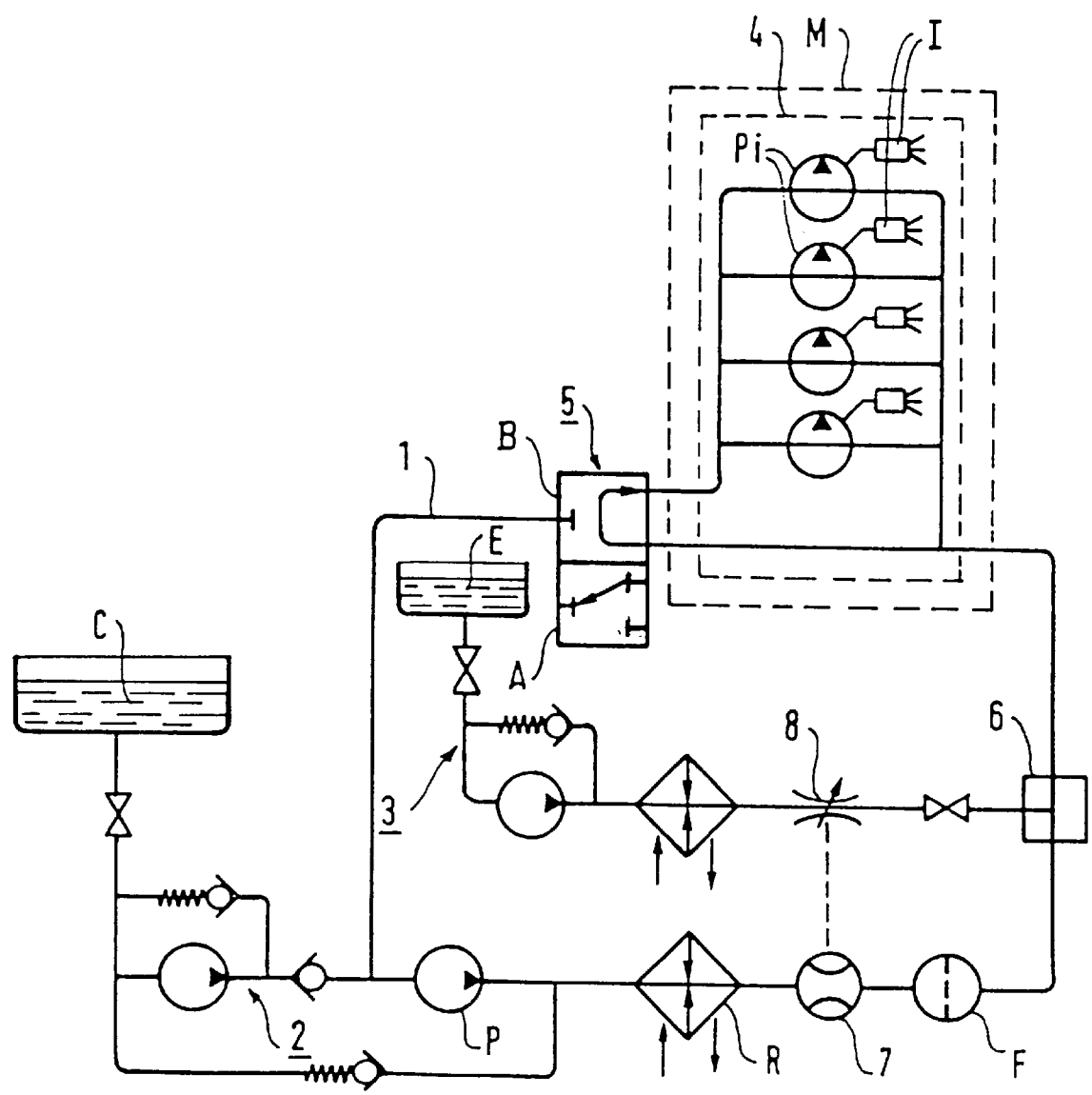
FIG. 2 is a diagram of a device for feeding liquid fuel to a diesel-type I.C. engine according to the invention.

FIG. 2 shows a device for feeding liquid fuel to a diesel-type I.C. engine according to the invention, in which the additional liquid is water.

This device according to the invention for feeding liquid fuel C to a diesel-type I.C. engine M also comprises a pipe 1 for feeding fuel to the injection pumps $P_i$ of the engine M.

The feed pipe 1 forms a supply loop and comprises an inlet pipe 2 for the fuel C, means for treating and circulating the fuel C and a pipe 3 for introducing water E into the fuel C.

The device according to the invention for feeding liquid fuel C to a diesel-type I.C. engine differs from the feed devices of the prior art in that the pipe 3 introducing water into the fuel feed pipe 1 is located immediately upstream of that part 4 of the feed pipe 1 which supplies the injection pumps $P_i$ of the engine M.

Moreover, a closure valve 5, capable of closing said feed pipe 1, is located immediately downstream of that part 4 of the feed pipe 1 which supplies the injection pumps $P_i$ of the engine M.

This closure valve 5 is capable of operating in accordance with a first operational mode noted A or in accordance with a second operational mode noted B.

According to a preferred embodiment, the end of pipe 3 introducing water E in pipe 1 feeding fuel C is composed of a mixer 6 mixing water E and fuel C.

The mixer 6 is preferably such that the drops of water present a size less than or equal to 0.5 mm.

The pipe 1 feeding fuel to the injection pumps $P_i$ comprises a device 7 for measuring the flowrate of fuel circulating in the feed pipe 1.

The flow measuring device 7 controls a device 8 for regulating the flowrate of water injected in the feed pipe 1.

The operation of the device feeding liquid fuel to a diesel-type I.C. engine according to the invention will now be described.

Below a given value of the load on the engine, for example a load between 20 and 50%, the closure valve 5 operates in accordance with the operational mode A and the introduction of water is interrupted.

The engine then operates with a feed loop whose arrangement is known.

Before the engine is started up, this feed loop allows the components to be reheated and the circuits to be bled or cleaned.

In operation above a value of load on the engine of between 20 and 50%, water, intended for example to reduce the nitrogen oxides, is introduced in the feed pipe.

Jointly with this introduction, the closure valve operates in accordance with operational mode B, which has for effect an interruption of the loop.

This interruption avoids having too great a volume of water/fuel mixture circulating in the feed pipe, having little inertia with respect to the variations in proportion of water and allowing return to operation in loop without water in a short time.

The short distance provided between the point of introduction of water and the feed nozzle of the injection pumps, together with an absence of circulation in loop, allows a fairly rough introduction of water leading to an unstable mixture but guaranteeing a correct local distribution of the water and fuel.

Moreover, this mixture does not have time to be destabilized before it arrives at the injection pumps, which, by their operation, ensure during delivery a finer homogenization of the mixture, namely that the droplets of water do not exceed 10 $\mu$m.

The device for measuring the flowrate of fuel controlling regulation of the flowrate of water, ensures a fixed proportion of the quantity of water in the fuel.

What is claimed is:

1. A device for feeding liquid fuel to a diesel-type I.C. engine, said device comprising a pipe feeding fuel to the injection pumps of said engine, said feed pipe forming a feed loop and comprising a pipe for admission of said fuel, means for treating and circulating said fuel and a pipe for introducing additional liquid into said fuel so as to provide a fuel/liquid mixture, wherein the point of connection of said pipe for introducing additional liquid to said fuel feed pipe is located immediately upstream of that part of said feed pipe which supplies said injection pumps of said engine, and a closure valve for closing said feed pipe such that said fuel/liquid mixture flows directly to said injection pumps without recirculating through said feedloop, said closure valve being located immediately downstream of said part of the feed pipe which supplies said injection pumps of said engine and, attendantly, downstream of said injection pumps.

2. The device of claim 1, wherein the point of connection of said pipe introducing additional liquid to said fuel feed pipe is composed of a mixer for said additional liquid and said fuel.

3. The device of claim 2, wherein said mixer is such that the drops of additional liquid present a size less than or equal to 0.5 mm.

4. The device of any one of claims 1 to 3, wherein said pipe feeding fuel to said injection pumps comprises a device for measuring the flowrate of fuel circulating in said feed pipe, said measuring device controlling a device for regulating the flowrate of additional liquid injected into said feed pipe.

5. The device of claim 4, wherein said device is operable in a first mode where said closure valve is in a position such that said additional liquid is not introduced into said fuel so that said fuel is circulated around said feed loop, and a second mode where said closure valve is in a position such that said additional liquid is mixed with said fuel so that said fuel/liquid mixture is supplied to said injection pump without recirculation.

* * * * *